Feb. 20, 1934.   W. R. REDD   1,948,240
OZONE GENERATOR
Filed July 30, 1932   2 Sheets-Sheet 2
Fig. 3.
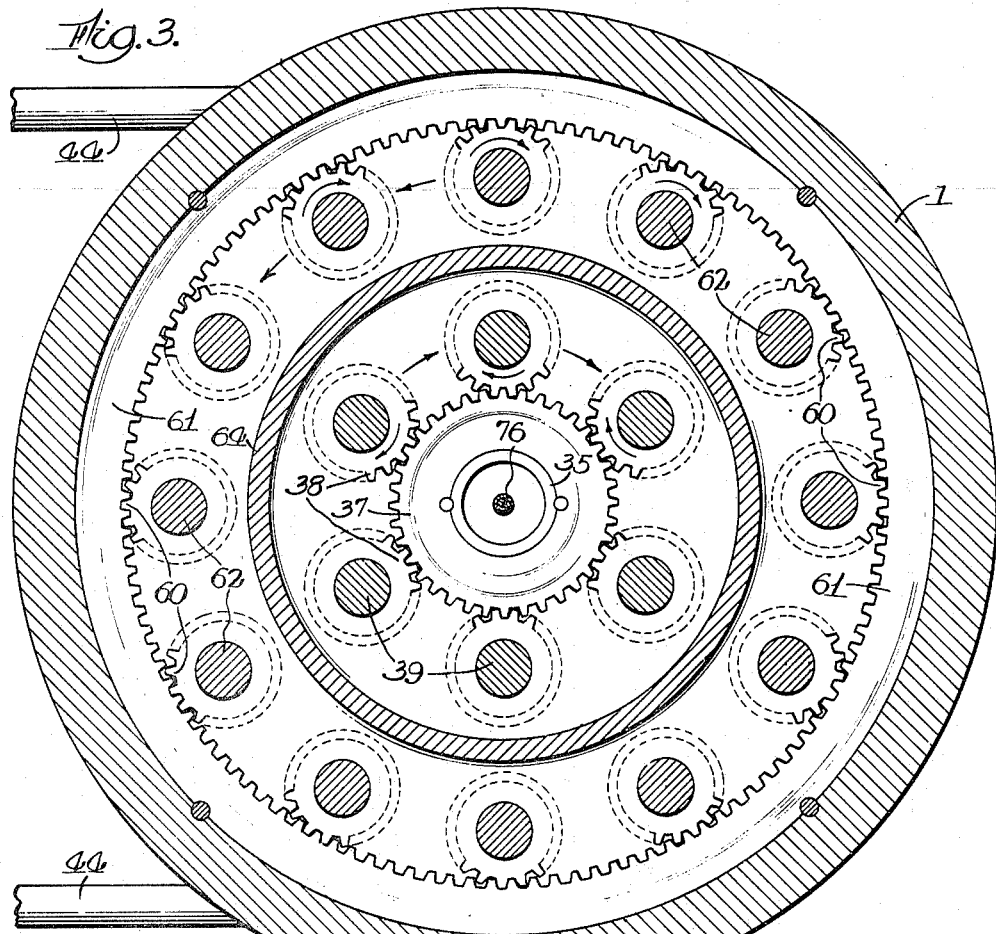
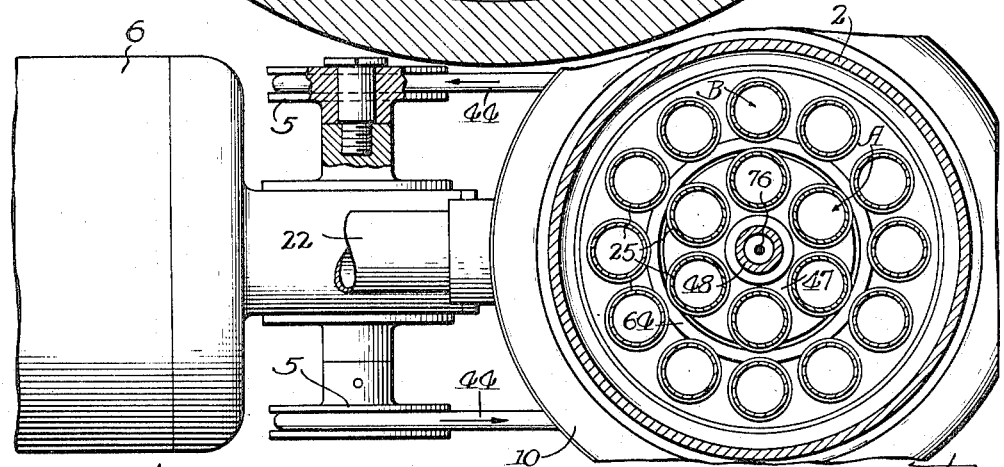
Fig. 2.
Inventor:
William R. Redd
By: George J. Haight Atty.

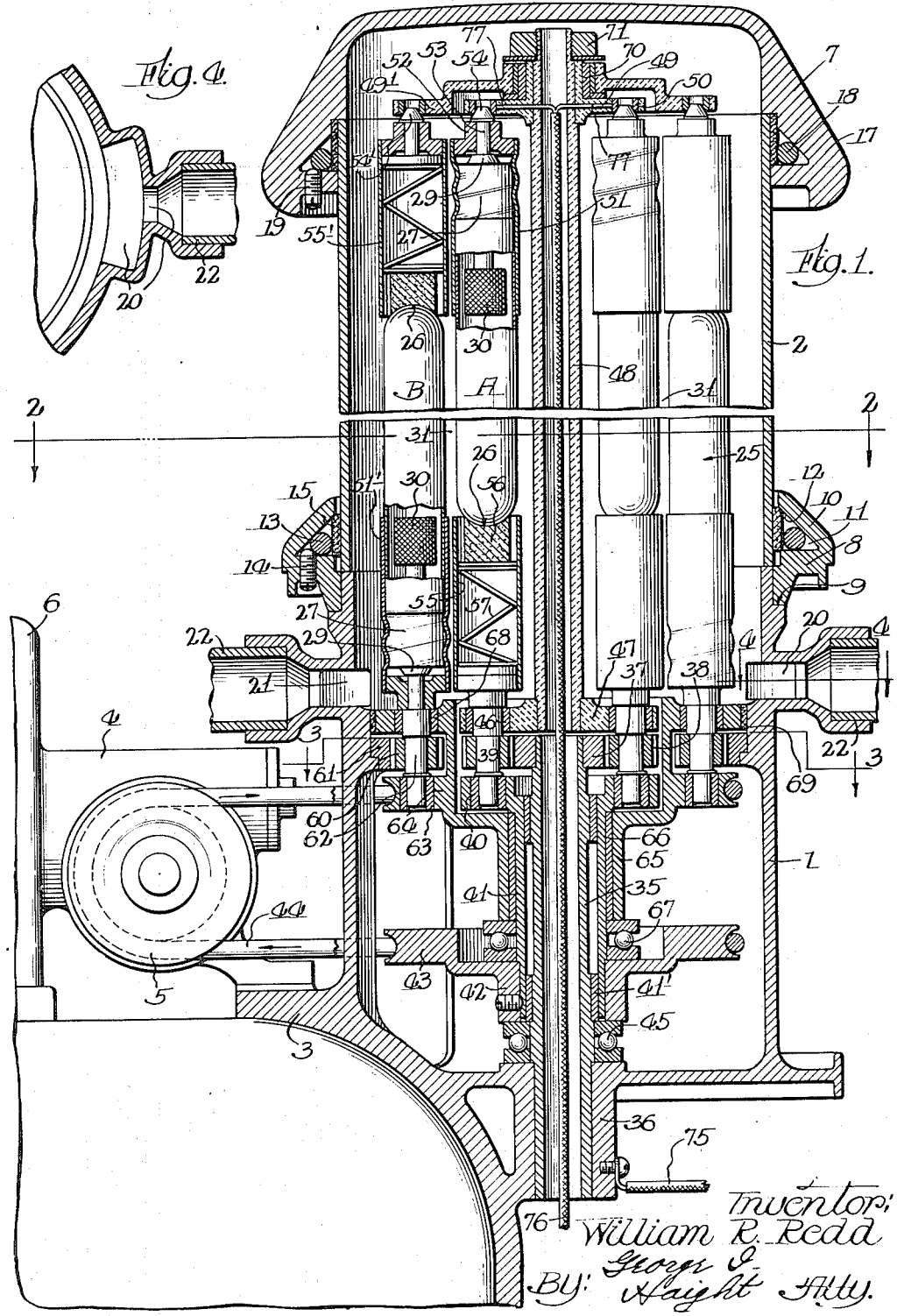

Patented Feb. 20, 1934

1,948,240

UNITED STATES PATENT OFFICE 1,948,240

OZONE GENERATOR

William R. Redd, Western Springs, Ill., assignor to Milprint Products Corporation, Milwaukee, Wis., a corporation of Wisconsin Application July 30, 1932. Serial No. 626,371

9 Claims. (Cl. 204—32)

My invention relates to improvements in apparatus for generating ozone and is more especially adapted for the continuous production of ozone for commercial or industrial purposes if desired. Instances of commercial applications of the use of ozone is in ventilating equipment or in laundries where clothes, as they are passed through the laundry operations, are treated with ozone for sterilizing and other purposes. Under conditions of this character it is desirable that the supply of ozone be continuous and invariable and of sufficient volume for the purpose.

One of the objects of my invention is to provide a machine or apparatus through which a continuous stream of air can be circulated and which will produce a steady unvarying volume of ozone without the production of impurities such as nitrous oxides and which will be capable of continuous operation without attention and without the necessity for frequent cleaning.

Another object of my invention is to provide a machine of the character above described, which can be built as a unitary structure capable of attachment to or in connection with the installation of any of the machines or equipment with which it is to be associated.

Another object of my invention is to provide an ozone generator of this character which has its operating parts housed within an enclosure through which the operation of said parts is visible, and which is readily and conveniently accessible so that its operating parts can be replaced by any unskilled person.

A further object is to provide an improved ozone generator which will be highly efficient by virtue of the fact that its ozone generating parts are maintained constantly in motion and in changing relation to each other to prevent the accumulation of dirt or deposit on their surfaces and to constantly change the relation of its electrodes or discharge tube surfaces between which the electrical discharge takes place in the generation of ozone.

Other objects of my invention will appear from the accompanying description in connection with the drawings which disclose one structural embodiment of my invention.

Referring to the accompanying drawings,

Fig. 1 is a central vertical section of an ozone generator embodying my invention;

Fig. 2 is a horizontal plan section substantially on the line 2—2 of Fig. 1;

Fig. 3 is an enlarged horizontal plan section substantially on the line 3—3 of Fig. 1; and Fig. 4 is a detailed section substantially on the line 4—4 of Fig. 1, illustrating one of the ports for admission of air to the housing.

The structure shown is provided with a housing which is substantially cylindrical in shape and is vertically disposed. This housing is made in two principal parts, 1 and 2, disposed in axial alignment. The lower section 1 encloses the driving mechanism for the ozone generating parts and may be made in any suitable shape for the purpose. In the structure shown, it is provided with a curved portion 3, serving as a support by which the ozone generating unit may be mounted upon the equipment with which it is to be associated. This section also has a lateral extension 4 constituting a support for the driving pulleys 5 and the motor 6.

The upper section of the housing is preferably made in the form of a glass cylinder open at both ends and forms, in conjunction with the upper portion of the lower section 1 and a cap or hood 7, a chamber or compartment through which the air to be treated is circulated and within which the electrode tubes are positioned. This section of the housing is preferably made of glass so that the enclosed ozone generating equipment is clearly visible from the outside.

It is desirable that the sections of the housing be capable of ready removal and replacement so that access may be readily gained to the interior thereof. For this reason the upper margin of section 1 carries a ring-shaped member 8 seated on a suitable shoulder 9 and having an upwardly extending flange 10 inclined toward the wall of section 2 to provide an internal groove 11 having an inclined wall 12, in which groove is contained a spring clamping ring 13. The ring is contracted against the glass cylinder 2 by a series of screws 14 which, as shown clearly in Fig. 1, force the clamping ring against the inclined wall 12 and cause the ring to contract and to grip the cylinder. A gasket of felt 15 surrounds the cylinder and is interposed between the cylinder wall and the clamping ring 13 to prevent breakage of the cylinder. By loosening the screws 14, the clamping ring 13 will expand and release the glass section 2, whereby it may be readily lifted out of its place or inserted therein.

The cap 7 for the structure is preferably of metal. It has a flange 17 which overhangs the upper end of the glass cylinder 2 and which has a V-shaped groove in which is provided a spring clamping ring 18 and screws 19 similar to that just described, whereby the cap is detachably sealed on the upper end of the cylinder.

The upper portion of the lower section 1 of the housing is provided with ports 20 and 21, one of which serves as an inlet to the ozone generating compartment for the air to be treated and the other of which forms an outlet for ozone. These inlet and outlet ports are connected by suitable pipes 22 to any suitable circulating system which will circulate air through the ozone generating chamber and deliver ozone to the point where it is used.

The ozone generating parts are located within the upper chamber of the structure and include a plurality of electrodes A and B, which are in the form of elongated vacuum tubes 25. In practice these tubes are preferably about fifteen inches long and about an inch and a half in diameter. They are preferably made of glass with one of their ends 26 rounded off and their opposite ends set in a suitable metal base 27. At the base ends these tubes carry central terminals 29 which are connected with internal discharge electrodes 30 which are preferably cylindrical in shape and made of screen wire.

A plurality of these tubes are utilized and they are arranged in two annular series or groups in concentric relation, so that one group is within the other. The tubes of the groups or series are disposed with their longitudinal axes in parallel relation so that the tubes of the inner group or series are annularly separated from the series of the outer group by discharge gaps 31, across which the arcing takes place from one tube to the other for the generation of ozone. For this reason, as will be described hereinafter, the outer series or group of electrode tubes are connected to one side of the line representing the source of energizing current while the inner series are connected to the other side of the line.

The two series of electrode tubes are given a rotary movement in opposite directions about the center or axis of the groups, and at the same time the individual tubes in both groups are rotated about their individual axes, those tubes in the inner group being individually rotated in an opposite direction to those of the outer group. Maintaining the tubes in a constant state of motion prevents the accumulation on the tube surfaces of any dirt or impurities in the air being treated and maintains a high state of efficiency of electrical discharge which takes place between the tubes. The rotation of each tube relatively to the others constantly changes the opposed surfaces to the other tubes between which the arcing takes place and effectively prevents the concentration of electric stresses and consequent breakage and loss of efficiency which would occur if the tubes were stationary and caused the discharge to take place always at one point.

Motion imparted to the tubes is accomplished by planetary gearing disposed in the upper portion of the lower section 1 of the housing. A centrally disposed stationary hollow member 35 is fixed at its lower end in a socket 36 of the housing and at its upper end supports a stationary spur gear 37, and around the periphery of this central stationary gear is a group of pinions 38 meshing therewith. These pinions are equally spaced apart and are adapted to travel bodily around the central gear 37 to impart a planetary movement as a group to the inner series of electrode tubes A and to rotate on their own axes to rotate the individual tubes.

The pinions are mounted on short vertical shafts 39 which are journaled below the pinions 38 in oilless bearing bushings 40 in a flange which is carried at the upper end of a sleeve 41. The lower end of this sleeve is secured to the hub 42 of a grooved pulley 43, which is driven by an endless belt 44 extending around and driven by one of the drive pulleys 5. The pulley 43 is supported by a ball thrust bearing 45 so that it may rotate free of the stationary tube 35. Oilless bearing bushings 41' are provided between the sleeve and the member 35. Above the pinions 38, the pinion shafts 39 are journaled in oilless bearings 46 in a disc 47. This disc 47 is of insulating material and carries an upright central hollow member 48 of insulating material which extends to the upper portion of the casing and is adapted to support, in proper spaced relation, the upper ends of the inner and outer group of electrode tubes. This central member 48 rotates by virtue of the connection of the disc 47 with the pinion shafts.

The member 48 carries at its upper end an insulating disc member 49 having seats 50 for the tube holders. The tube holders consist of short tubular members 51 into which the terminal ends of the electrode tubes A are inserted. The tube holders have heads 52 in which central conductors 53 are mounted. The inner ends of these conductors are adapted to be engaged by the terminals 29 of the electrode tubes. The outer ends of these conductors have tapered ends 54 which are seated in the seats 50 to permit the tube holders to rotate. These tube holders 51 serve as sockets which can be slipped over the terminal ends of the electrode tubes and then inserted in position.

The upper ends of the pinion shafts 39 carry similar holders 55 comprising tubular members open at their upper ends except that they have no provision for electrical connection with the tubes A, but have instead cushion blocks 56 with concave ends to bear against the rounded end 26 of the electrode tubes for holding the tubes in vertical aligned position and imparting rotary motion to the individual tubes when the shafts 39 are rotated. These blocks 56 are yieldingly held against the ends of the tubes by springs 57 with sufficient pressure to perform the functions above mentioned. This arrangement permits the convenient removal and replacement of the electrode tubes. To remove a tube, it is simply necessary to press the tube lengthwise down into the holder socket 55 against the action of the spring 57 until the upper end, including the holder 51, is disconnected from the disc 49; whereupon, the holder 51 and tube may be removed and the holder then removed from the tube.

The outer series of electrode tubes B are rotated individually and bodily as a group similar to the inner group A, but in the opposite direction. Each of these outer tubes B are associated with a pinion 60 which meshes and travels bodily around the inner periphery of a fixed ring gear 61 mounted in the casing 1. These pinions 60 are mounted on shafts 62, the lower ends of which are journaled in oilless bearing bushings 63 in a grooved pulley 64 which is driven in the opposite direction to that of pulley 43 by the belt 44. Pulley 64 has an offset hub 65 which is journaled to rotate on, but independently of, the sleeve 41, an oilless bushing 66 being interposed between said hub and sleeve. The lower end of the hub 65 rests upon and is supported by an end-thrust roller bearing 67. The purpose of offsetting the hub 65 to provide a central recess in the pulley is to permit the gears and parts associated with the driving of the inner group of tubes A, to be positioned in the same plane as the corresponding gears and parts associated with the outer group. The pulley 64 is extended upwardly to support bushed bearings 68 for the upper ends of the pinion shaft 62. Between the periphery of the extension of pulley 64 and the wall of the housing, a felt ring washer 69 is interposed for the purpose of sealing the upper ozone compartment against leakage at this point.

The arrangement of the outer group of tubes is similar to that of the inner group, except that the electrode tubes are reversed in the sense that their terminal or base ends 27 are lowermost and their rounded ends uppermost. Accordingly the holders 51' and 55' are reversed so that the holders 51' for the outer group of tubes are carried by the upper ends of the pinion shafts 62 and the holders 55' are positioned to bear against the upper ends of the tubes and are provided with tapered ends 54¹ which are detachably seated against an insulated disc 49¹, the hub of which is journaled on the upper end of the central support 48. Oilless bearing bushings 70 are interposed between the two upper insulated discs 49' and 49 to permit relative rotation thereof. The upper end of the support member 48 is reduced in diameter and threaded to provide for a clamping nut 71 which detachably holds the discs 49 and 49¹ in position. The holders 51' for the outer series of tubes B are mounted on the upper ends of the pinion shafts 62 so that the terminals 29 of the tubes will make contact therewith. These holders can be fastened to the shafts so as not to be detachable, but the tubes B of the outer series may be as readily removed as the inner series because the outer holders 55 are readily removable.

As previously mentioned, the electrode tubes A and B are elongated in shape and are vacuum tubes of the positive column type containing a rarified medium. This medium preferably includes a suitable gas, such as neon, which when ionized will become luminescent to some extent, the purpose being to render the operation of the tubes visible so that it can be observed through the glass cylindrical wall of the ozone compartment. The tubes, however, differ from the usual positive column tubes having a terminal at each end, so that the arc takes place within the tube and between the terminals. The tubes which I employ for this purpose have a single terminal at one end of the tube, as previously described, and this terminal is connected to a single electrode 30 within the tube. When two single electrode tubes of this character are connected to opposite sides of the source of ionizing potential and spaced apart to provide a gap therebetween, the gap outside of the tubes is included in the arc which takes place between the tubes. Thus, the tubes as a whole constitute electrodes between which in the gap 31 the arc takes place. Thus, air circulated around the tubes in the upper compartment of the housing is subjected to the arc which takes place in the gaps 31 between the tubes.

As previously mentioned, the outer series of tubes are grounded on the frame of the machine through their terminals 29, the pinion shafts 62 and the gears associated therewith, and the frame of the machine is connected by means of a suitable conductor 75 to one side of the source of ionizing potential. The inner group of electrode tubes are insulated from the frame of the machine as previously described, by means of a central supporting member 48 and the discs 49. These inner tubes are connected to the opposite side of the source of ionizing potential means of an insulated conductor 76 which extends upwardly through the central supporting members 35 and 48, and at its upper end is provided with branches 77 which extend through radial holes in the disc 49 and are connected to the bushings 50 in which the terminal ends 54 of the tube holders are seated, these bushings being made of metal so that they will constitute conductors and thus complete the connection to the conductor 75.

It is obvious that various changes may be made in the construction, operation and arrangement of the parts, without departing from the spirit of the invention, and it is understood that I contemplate such changes as fairly come within the scope and spirit of the appended claims.

I claim:

1. In an ozone generator of the class described, the combination of a housing forming an ozone generating compartment through which air is circulated, a plurality of groups of vacuum tubes forming electrodes positioned within said compartment so that the electrodes of one group are in spaced relation to the electrodes of another group to form discharge gaps therebetween, means for maintaining the groups in motion relatively to each other, and means for maintaining the individual electrodes of each group in motion relatively to the other electrodes in the group and relatively to the electrodes of the other groups.

2. In an ozone generator of the class described, the combination of a housing forming a compartment within which air to be treated is circulated, a plurality of vertically disposed elongated vacuum tubes forming electrodes positioned within said compartment and arranged in concentrically disposed groups with the electrodes in the groups in parallel relation and spaced apart to form discharge gaps, holders for the ends of said tubes forming terminal connections for the tubes, means for rotating the groups of holders relatively to each other, and means for rotating the individual holders to rotate the electrodes in one group in opposite directions relatively to the individual electrodes in the other groups.

3. In an ozone generator, the combination of a housing forming a compartment through which air to be treated is circulated, a plurality of annular series of elongated tubular vacuum tubes forming electrodes, the tubes in the series being disposed in axially parallel relation and separated to provide discharge gaps between the tubes of one series and the tubes of another series, means for rotating the series of tubes concentrically in opposite directions, and means for individually rotating the tubes in the series about their own axes.

4. In an ozone generator, the combination of a housing forming a compartment through which air to be treated is circulated, a plurality of annular series of elongated tubular vacuum tubes forming electrodes, the tubes in the series being disposed in axially parallel relation and separated to provide discharge gaps between the tubes of one series and the tubes of another series, and planetary gear mechanism associated with each series of tubes for rotating the individual tubes about their own axes and for rotating the series of tubes about a common axis.

5. In an ozone generator, the combination of a housing forming a compartment within which the air to be treated is circulated, a pair of elongated vacuum tube electrodes positioned in said compartment in axially parallel relation and spaced apart to provide a discharge gap therebetween, said tubes being provided with a single terminal at one end, holders for said tubes having means for making electrical connections with said terminals, and means for rotating the holders to turn the tubes about their axes.

6. In an ozone generator, the combination of a pair of electrodes comprising elongated tubular electrodes spaced apart in parallel relation to form a discharge gap therebetween, said electrodes having terminals at one end and holders for said electrodes, including sockets in which the terminal ends of said electrodes are inserted and yielding members bearing against the ends of said electrodes opposite the terminal ends thereof, and means for rotating the holders to turn the tubes about their axes.

7. In an ozone generator, the combination of a housing including a section forming a compartment through which air is circulated for treatment, said compartment-forming section including a wall of glass, ozone generating means within said compartment including a plurality of tubular vacuum tubes forming electrodes parallelly disposed and separated to provide discharge gaps across which an electrical discharge takes place, and means for maintaining said tubes constantly in motion bodily relatively to each other and individually in rotary motion.

8. In an ozone generator, the combination of a housing forming a chamber through which air to be treated is circulated, and having inlet and outlet ports, a plurality of electrodes comprising glass tubular members vertically disposed in axially parallel relation and arranged in an outer and an inner circular series in concentric relation with the tubes in the inner and outer series spaced apart to form discharge gaps therebetween, holders for the upper and lower ends of said tubes, means for supporting said holders for rotation about their axes and for bodily movement, and mechanism for rotating the holders and for bodily revolving the inner series and the outer series in opposite directions relatively to each other.

9. In an ozone generator of the class described, the combination of a housing through which the air to be ozonized is circulated, a plurality of series of tube-holding means bodily rotatable with respect to each other, each holding means comprising a terminal socket and a yielding socket spaced apart, the holding means in one series being inverted with respect to the holding means in another series; a plurality of vacuum tubes mounted in said holding means and comprising elongated glass tubes having an inner electrode at one end and an exterior terminal at the corresponding end, said terminal end being detachably connected with the terminal socket of the holding means, and said yielding socket yieldingly bearing against the opposite end of the tube; and means for bodily rotating the series of holding means and tubes and for individually rotating the holding means and tubes about their axes.

WILLIAM R. REDD.